UNITED STATES PATENT OFFICE 2,401,544

PRODUCTION OF SILICON TETRACHLORIDE AND TITANIUM TETRACHLORIDE

Paul S. Brallier, Niagara Falls, N. Y., assignor to Stauffer Chemical Company, a corporation of California No Drawing. Application June 24, 1943, Serial No. 492,126

3 Claims. (Cl. 23—87)

This invention relates to the production of the tetrachlorides of silicon and titanium.

I have discovered that silicon tetrachloride and titanium tetrachloride can be advantageously formed in the presence of each other to provide a gas stream consisting of a mixture of silicon tetrachloride and titanium tetrachloride. This stream is cooled to condense the mixed chlorides as a liquid. Subsequently the two tetrachlorides are separated by a simple fractional distillation. The simultaneous production of the two tetrachlorides possesses several advantages. For example, titanium tetrachloride has heretofore been produced by chlorination of titanium carbide and the complex, titanium cyanonitride. These materials are produced by electric furnace operations. Their production involves the use of power, electric furnace capacity and high temperatures; these are necessarily reflected in their high final cost.

When one attempts to form titanium tetrachloride from titanium oxide by chlorination in the presence of a reducing agent such as carbon or carbon monoxide, several difficulties are now encountered. First, it is necessary to supply heat from an external source. Second, the reaction must be carried on in equipment which is inert to the action of chlorine and titanium chloride vapors in a temperature range between about 700° and 1000° C.

While the reaction $TiO_2 + 2C + 2Cl_2 = TiCl_4 + 2CO$ is slightly exothermic and would go on continuously simply by adding chlorine gas and fresh titanium oxide reducing agent mixture to the reaction zone, this is not feasible because of heat losses on a commercial scale. Also, withdrawal of the reaction products from the zone is usually effected at a temperature of about 400° C. The heat thus withdrawn is more than the heat developed by formation of titanium tetrachloride and carbon monoxide from the oxide and carbon. The net effect of this, therefore, is that heat must be supplied to the reaction zone from an external source. The special construction materials which will not be attacked by chlorine and titanium terachloride vapors at the elevated temperatures, make heat supply to the reaction zone very difficult if not impractical.

I have found that one can advantageously employ chlorination of silicon to develop supplemental heat within the reaction zone in a shaft furnace by supplying silicon to the titanium material undergoing reduction and chlorination. For example, by including silicon in the reaction zone in a sufficient amount, it is possible to form titanium tetrachloride continuously, without external heating of the reaction zone, utilizing a titanium oxide source material. Thus one is able to avoid entirely any dependency upon the use of either titanium carbide or titanium cyanonitride.

The quantity of silicon to be included depends upon two factors, (a) the temperature at which the products of reaction are removed from the shaft furnace and (b) the heat loss from the furnace. For example, if the formation of one pound of titanium tetrachloride by reduction-chlorination of a mixture of titanium oxide and carbon, 462 B. t. u. are absorbed. This is based upon the assumption that the reaction products are withdrawn at a temperature of 400° C. and that no heat loss occurs in the furnace. By including 126 pounds of silicon for each 1000 pounds titanium oxide, it is possible to produce a mixture of silicon tetrachloride and titanium tetrachloride without the necessity of supplying any external heat to the product. This is on the assumption that no heat loss occurs in the furnace. However, since heat losses are unavoidable, this ratio cannot be obtained in practice and it is therefore necessary to employ more than the theoretical quantity of silicon. The upper limit of the silicon quantity to be added is that whereat so much heat is liberated that its removal from the furnace becomes a problem and cooling of some type must be practiced. Usually about 0.28 pound of silicon suffices per pound of titanium oxide if carbon is the reducing agent for the oxide. If carbon monoxide is used, less than about 0.11 pound suffices.

I do not wish to exclude from the operation the presence of titanium carbide or titanium cyanonitride, for these can be added to the titanium oxide material along with the silicon. In fact, one can operate upon a mixture of silicon and titanium carbide or titanium cyanonitride to advantage. However, in this case it may be necessary to practice cooling of the furnace because of the heat evolved by operating upon a mixture of silicon with either the carbide or the nitride or with both of them. One still gains the advantage of producing the tetrachlorides of both silicon and titanium. These can be employed subsequently as such or they can be easily fractionated into the two tetrachlorides by a simple distillation. The simultaneous production of the two tetrachlorides has another material advantage in that the presence of the less volatile titanium tetrachloride lowers the vapor pressure of the more volatile silicon tetrachloride and enables it to be condensed with greater ease and more nearly completely.

In place of titanium oxide one can use any other material containing an appreciable percentage of the oxide such as rutile, ilmenite and ferro-titanates. Carbon, carbon monoxide or other carbonaceous reducing agents can be employed while chlorine and materials supplying chlorine can be used as a chlorine source, including phosgene, carbon tetrachloride, other chlorinated hydrocarbons or other gaseous chlorinating agents used in conjunction with or in lieu of chlorine. As a silicon source I have used the "90% silicon" of commerce, which usually contains about 92% silicon with a small quantity of iron and other materials.

The ratio of the silicon to oxide has been previously discussed. If it is desired to use cyanonitride in conjunction with the silicon-oxide mixture, the nitride replaces the silicon, on a theoretical basis of about 2.35 pounds of the nitride per pound of silicon. Titanium carbide can be substituted for the silicon on the basis of 2.75 pounds in place of 1 pound of the nitride.

The practice of the invention will be made further apparent upon considering the following examples:

*Example 1.*—A mixture of 1000 pounds of titanium oxide and 400 pounds of carbon was formed into briquets and these briquets, together with 280 pounds of commercial 90% silicon, were fed into a suitable shaft furnace which had been initially heated to a temperatude of about 1000° C. The heat from the furnace walls was sufficient to bring the charge up to a temperature at which reaction with chlorine would proceed. Chlorine was then fed into the bottom of the shaft and a mixture of silicon tetrachloride and titanium tetrachloride vapors and accompanying gaseous reaction products were withdrawn from the top of the shaft at a temperature of approximately 400° C. and led to a suitable condensing system. The rate of chlorine feed was adjusted to maintain suitable reaction and discharge temperatures respectively; additional titanium oxide briquets and 90% silicon, in the proportions given above, were added to the shaft periodically to make up for the part of the charge which had been chlorinated. Chlorination of both the titanium oxide and the silicon was substantially complete. The mixture of titanium tetrachloride and silicon tetrachloride from the condensing system was subsequently separated by fractional distillation into commercial grades of titanium tetrachloride and silicon tetrachloride.

*Example 2.*—The same procedure as outlined above in Example 1 was followed except that instead of 280 pounds of 90% silicon per 1000 pounds of titanium oxide, 100 pounds of 90% silicon and 422 pounds of cyanonitride were used.

While the mechanism of the reactions involved in formation of titanium tetrachloride from the oxide can be represented by the following:

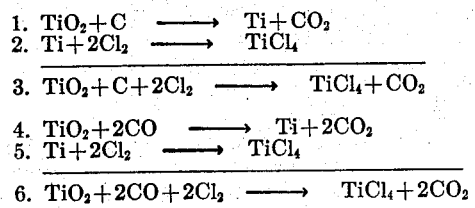

6. $TiO_2 + 2CO + 2Cl_2 \longrightarrow TiCl_4 + 2CO_2$ and while the stoichiometry of the process follows the summation reactions 3 and 6, uncertainty does exist as to the actual mechanism of the reduction-chlorination. This will be further apparent when it is pointed out that so far no one has succeeded in producing metallic titanium directly from the oxide by reducing the oxide with either carbon or carbon monoxide. While one can gauge the quantity of reducing agent to be employed by the quantity of oxide present (as in reactons 1 and 4), and the quantity of chlorine by the quantity of titanium theoretically available upon reduction of the oxide (as in reactions 2 and 5), one should not infer that the operation actually proceeds stepwise in accordance with reactions 1, 2, 4 and 5.

I claim:

1. A process for manufacture of silicon tetrachloride and titanium tetrachloride in a shaft furnace comprising preheating the furnace only initially to a temperature between about 400° C. and 1000° C.; continuously introducing into the preheated furnace a reducing agent and a mixture of silicon and a material containing titanium oxide, the reducing agent being continuously introduced in a quantity only sufficient substantially to reduce the oxide to titanium; continuously introducing chlorine into a lower portion of the furnace sufficient to chlorinate the silicon and titanium to their respective tetrachlorides and in a reaction medium containing substantially no other exothermic reactants, the quantity of silicon and reducing agent being sufficient to maintain, by the heat generated by the reaction without external heating, a temperature sufficient for continuous formation and vaporization of said tetrachlorides under continued furnace operation.

2. In a process for manufacture of silicon tetrachloride and titanium tetrachloride in a shaft furnace preheated to a temperature at which the process proceeds, the continuously practised steps consisting of introducing into an upper portion of the furnace a solid feed consisting of silicon and a material containing titanium oxide, introducing a reducing agent into said furnace in a quantity only sufficient substantially to effect reduction of said oxide, introducing chlorine into a lower portion of said furnace to chlorinate the available silicon and titanium in a reaction medium containing substantially no other exothermic reactants, the quantity of silicon and reducing agent being sufficient to maintain, by the heat generated by the reaction without external heating, a temperature sufficient for continuous formation and vaporization of said tetrachlorides under continued furnace operation.

3. In a continuous process for manufacture of silicon tetrachloride and titanium tetrachloride in a reaction zone preheated to reaction temperature, the continuously practised steps of introducing into said zone sufficient (a) silicon, (b) titanoum oxide, (c) a reducing agent and (d) chlorine to produce a mixture of titanium tetrachloride and silicon tetrachloride as products of reaction in a reaction medium containing substantially no other exothermic reactants, the quantity of silicon and reducing agent being sufficient to maintain, by the heat generated by the reaction without external heating, a temperature sufficient for continuous formation and vaporization of said tetrachlorides under continued furnace operation, condensing said tetrachlorides as a liquid mixture, and separating the silicon tetrachloride from the titanium tetrachloride.

PAUL S. BRALLIER.